US011432133B2

(12) United States Patent
Huang

(10) Patent No.: US 11,432,133 B2
(45) Date of Patent: Aug. 30, 2022

(54) SERVICE PROCESSING METHOD AND MOBILE COMMUNICATION TERMINAL

(71) Applicant: VIVO MOBILE COMMUNICATION CO., LTD., Chang'an Dongguan (CN)

(72) Inventor: Li Huang, Chang'an Dongguan (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 0 days.

(21) Appl. No.: 16/962,280

(22) PCT Filed: Jan. 11, 2019

(86) PCT No.: PCT/CN2019/071325
§ 371 (c)(1),
(2) Date: Jul. 15, 2020

(87) PCT Pub. No.: WO2019/141132
PCT Pub. Date: Jul. 25, 2019

(65) Prior Publication Data
US 2020/0351636 A1    Nov. 5, 2020

(30) Foreign Application Priority Data
Jan. 17, 2018    (CN) .......................... 201810043632.4

(51) Int. Cl.
  *H04W 8/18*     (2009.01)
  *H04W 8/20*     (2009.01)
  *H04W 88/06*    (2009.01)
(52) U.S. Cl.
  CPC ........... *H04W 8/183* (2013.01); *H04W 8/205* (2013.01); *H04W 88/06* (2013.01)
(58) Field of Classification Search
  CPC ..... H04W 8/183; H04W 8/205; H04W 88/06; H04W 4/16; H04W 4/50; H04W 4/60; H04L 41/0806
  (Continued)

(56) References Cited

U.S. PATENT DOCUMENTS

2008/0064443 A1* 3/2008 Shin .................. H04W 8/205
                                                455/558
2009/0180451 A1   7/2009 Alpert et al.
(Continued)

FOREIGN PATENT DOCUMENTS

CN    104754545 A    7/2015
CN    105848120 A    8/2016
(Continued)

OTHER PUBLICATIONS

International Search Report & Written Opinion related to Application No. PCT/CN2019/071325; dated Apr. 1, 2019.
(Continued)

*Primary Examiner* — Hirdepal Singh
(74) *Attorney, Agent, or Firm* — von Briesen & Roper, s.c.

(57) ABSTRACT

The present disclosure relates to the field of communication technology, and provides a service processing method and a mobile communication terminal. The service processing method includes: when a service configuration request corresponding to a second SIM card has been detected, determining whether a data network for a first SIM card has been enabled, the service configuration request being a request to be transmitted via the data network; and when the data network for the first SIM card has been enabled, transmitting a service configuration request message for the second SIM card via the data network for the first SIM card.

12 Claims, 4 Drawing Sheets

(58) Field of Classification Search
USPC .................................................. 455/418
See application file for complete search history.

(56) References Cited

U.S. PATENT DOCUMENTS

| | | |
|---|---|---|
| 2011/0012987 A1 | 1/2011 | Yoon |
| 2012/0178500 A1 | 7/2012 | Hwang |
| 2014/0274006 A1 | 9/2014 | Mutya et al. |
| 2014/0364118 A1 | 12/2014 | Belghoul et al. |
| 2016/0353449 A1 | 12/2016 | Chuttani et al. |
| 2018/0337921 A1* | 11/2018 | Wang ................. H04L 63/0876 |
| 2019/0069162 A1 | 2/2019 | Lindheimer et al. |
| 2019/0253874 A1* | 8/2019 | Salm ..................... H04W 60/00 |
| 2020/0267533 A1* | 8/2020 | Zhang ................. H04W 76/16 |
| 2021/0105740 A1* | 4/2021 | Huang ................. H04W 88/02 |

FOREIGN PATENT DOCUMENTS

| | | |
|---|---|---|
| CN | 108282759 A | 7/2018 |
| JP | 2016511622 A | 4/2016 |
| KR | 20110008441 A | 1/2011 |
| KR | 20120079901 A | 7/2012 |
| WO | 2017080231 A1 | 5/2017 |
| WO | 2017155434 A1 | 9/2017 |
| WO | 2018001449 A1 | 1/2018 |

OTHER PUBLICATIONS

Extended European Search Report for related Application No. 19740999.8; dated Feb. 17, 2021.
Australian Examination Report for related Application No. 2019208662; dated Jan. 12, 2021.
GSM Association, "Requirements for Multi SIM Devices", Official Document TS.37, Version 1.0, Dec. 16, 2016.
South Korean Office Action for related Application No. 10-2020-7019241; dated Apr. 21, 2021.
South Korean Notification of Reasons for Refusal for related Application No. Oct. 2020-7019241; dated Oct. 26, 2021.

* cited by examiner

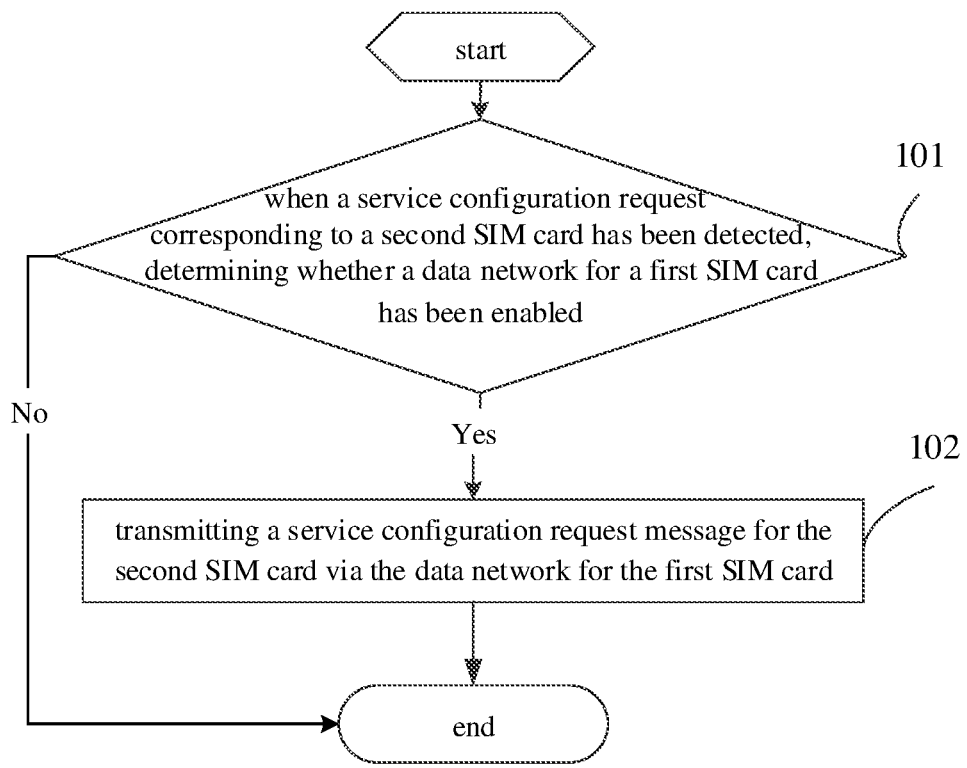
Fig. 1
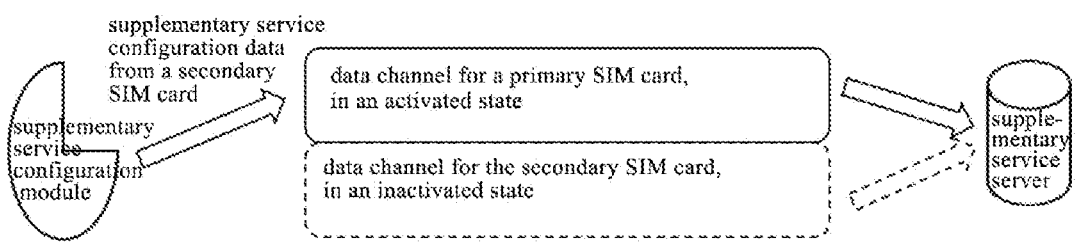
Fig. 1-a

SERVICE PROCESSING METHOD AND MOBILE COMMUNICATION TERMINAL

CROSS-REFERENCE TO RELATED APPLICATION

This patent application is a 35 USC & 371 U.S. national stage of International Application No. PCT/CN2019/071325 filed on Jan. 11, 2019, which claims a priority of the Chinese Patent Application No. 201810043632.4 filed on Jan. 17, 2018, which is incorporated herein by reference in its entirety.

TECHNICAL FIELD

The present disclosure relates to the field of communication technology, in particular to a service processing method and a mobile communication terminal.

BACKGROUND

Currently, a dual-card dual-standby mobile communication terminal has been presented for a user having a plurality of Subscriber Identity Module (SIM) cards (e.g., one SIM card for business communication and the other for privacy communication). The two SIM cards in the mobile communication terminal may be registered to be in a standby state simultaneously.

However, for the sake of cost saving, the dual-card dual-standby mobile communication terminal is merely provided with one set of antenna resources in the related art, so each SIM card needs to occupy the set of antenna resources exclusively during the service processing. Due to this characteristic, i.e., the exclusive occupation of the antenna resources, service interruption may occur for the mobile communication terminal during the handover of a data channel for each SIM card. For example, when a data service is processed by the mobile communication terminal using a primary SIM card and it is necessary to configure services for a secondary SIM card, the data service for the primary SIM card will be interrupted.

In a word, for the conventional mobile communication terminal, when the service for one SIM card is currently being configured, the service for the other SIM card may be adversely affected.

SUMMARY

An object of the present disclosure is to provide a service processing method and a mobile communication terminal, so as to prevent the service for one SIM card from being adversely affected when the service for the other SIM card is currently being configured by the mobile communication terminal.

In one aspect, the present disclosure provides in some embodiments a service processing method, including: when a service configuration request corresponding to a second SIM card has been detected, determining whether a data network for a first SIM card has been enabled, the service configuration request being a request to be transmitted via the data network; and when the data network for the first SIM card has been enabled, transmitting a service configuration request message for the second SIM card via the data network for the first SIM card.

In another aspect, the present disclosure provides in some embodiments a mobile communication terminal, including: a determination module configured to, when a service configuration request corresponding to a second SIM card has been detected, determine whether a data network for a first SIM card has been enabled, the service configuration request being a request to be transmitted via the data network; and a transmission module configured to, when the determination module determines that the data network for the first SIM card has been enabled, transmit a service configuration request message for the second SIM card via the data network for the first SIM card.

In yet another aspect, the present disclosure provides in some embodiments a mobile communication terminal, including a memory, a processor, and a computer program stored in the memory and executed by the processor. The processor is configured to execute the computer program so as to implement the above-mentioned service processing method.

In still yet another aspect, the present disclosure provides in some embodiments a computer-readable storage medium storing therein a computer program. The computer program is executed by a processor so as to implement the above-mentioned service processing method.

According to the embodiments of the present disclosure, when the service configuration request corresponding to the second SIM card has been detected, whether the data network for the first SIM card has been enabled may be determined, and the service configuration request may be a request to be transmitted via the data network. When the data network for the first SIM card has been enabled, the service configuration request message for the second SIM card may be transmitted via the data network for the first SIM card. In this way, when a service is configured by the mobile communication terminal for one SIM card, the service may be configured via the data network that has already existed for the mobile communication terminal, and it is unnecessary to switch the data network for the mobile communication terminal. As a result, through the service processing method in the embodiments of the present disclosure, it is able to prevent the service for the other SIM card from being adversely affected.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

FIG. 1 is a flow chart of a service processing method according to one embodiment of the present disclosure;

FIG. 1-a is a schematic view showing the service processing method according to one embodiment of the present disclosure;

DETAILED DESCRIPTION

Figure 2:
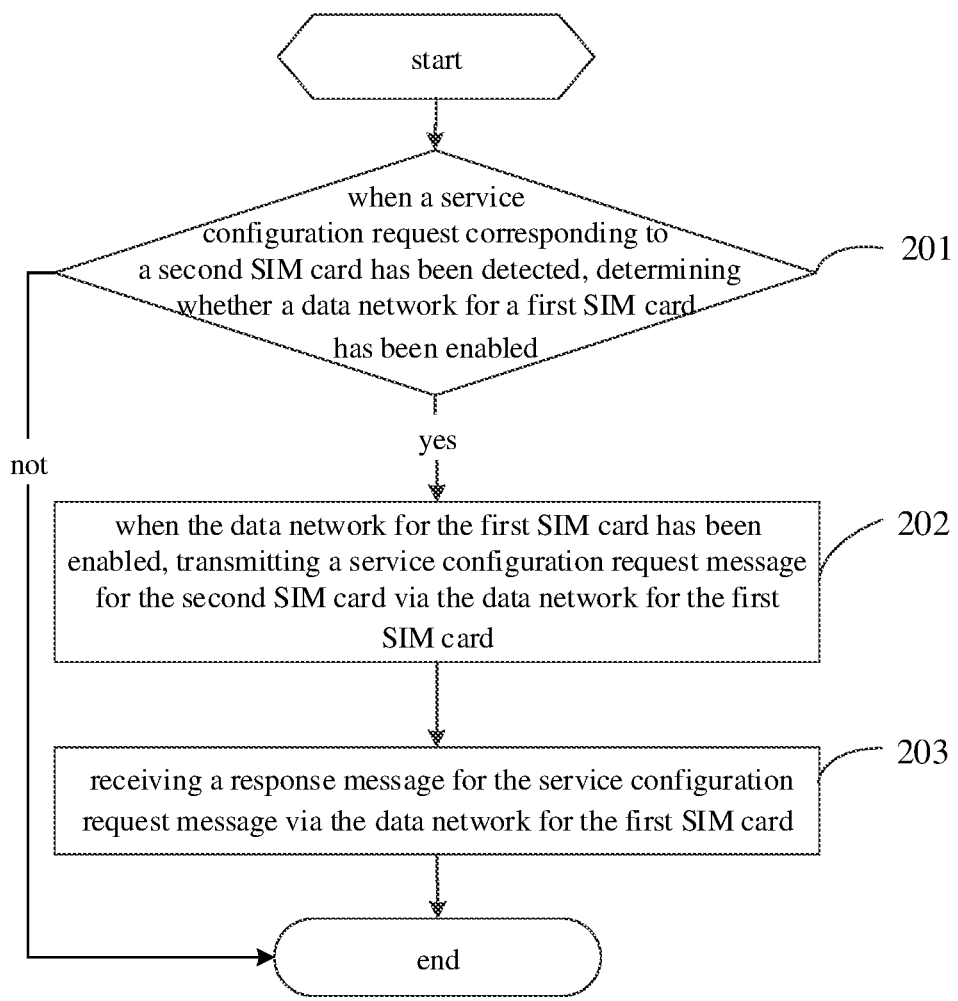
FIG. 2 is another flow chart of the service processing method according to one embodiment of the present disclosure.

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Referring to FIG. 1, the present disclosure provides in some embodiments a service processing method applied for a mobile communication terminal which is capable of supporting a first SIM card and a second SIM card simultaneously. As shown in FIG. 1, the service processing method may include the following steps.

Step 101: when a service configuration request corresponding to the second SIM card has been detected, determining whether a data network for the first SIM card has been enabled, the service configuration request being a request to be transmitted via the data network.

A service corresponding to the service configuration request may include a service bound to the SIM card and capable of being processed via the data network for any SIM card in the mobile communication terminal, e.g., a multimedia message service or a call forwarding service.

To be specific, the service configuration request may be a supplementary service configuration request, and the supplementary service configuration request may be a request for supplementing or modifying a basic service for the second SIM card. The basic service may be a basic telecommunications service, and a supplementary service may be a service for modifying or supplementing the basic telecommunications service. For example, when the basic service is a call service, the supplementary service may be a call waiting service or a call holding service attached onto the call service. When a user operates the mobile communication terminal to handle a service, the mobile communication terminal may detect the service configuration request triggered by the user's operation.

In the related art, when the mobile communication terminal is provided with a primary SIM card and a secondary SIM card, the service is processed via a data network for the primary SIM card by default. When the service is currently being processed by the primary SIM card and a service configuration request corresponding to the secondary SIM card has been received, the mobile communication terminal may switch a data channel to the secondary SIM card, i.e., the data network for the primary SIM card may be disabled and a data network for the secondary SIM card may be enabled, and the service may be processed through a data channel established for the secondary SIM card. In this embodiment, the second SIM card is regard as the secondary SIM card.

When the data network for the first SIM card has been enabled, the mobile communication terminal may exchange information with a server via the data network for the first SIM card, and process a data service. A data network for the mobile communication terminal may be enabled, i.e., a Packet Data Protocol (PDP) or a Packet Data Network (PDN) may be activated, and a network service for the mobile communication terminal may be bound to the PDP or the PDN. Based on the above characteristic, it is able to determine whether the data network for the first SIM card has been enabled.

Step 102: when the data network for the first SIM card has been enabled, transmitting a service configuration request message for the second SIM card via the data network for the first SIM card.

In this step, when the data network for the first SIM card has been enabled, the mobile communication terminal may exchange information with the server via the data network for the first SIM card, so as to transmit the service configuration request message.

For example, as shown in FIG. 1-*a*, the primary SIM card and the secondary SIM card may be provided in the mobile communication terminal. When the data channel, i.e., the data network, for the primary SIM card has been enabled, the data channel, i.e., the data network, for the secondary SIM card has not been enabled, and it is necessary to configure a supplementary service for the secondary SIM card, a supplementary service configuration request message may be transmitted by a supplementary service configuration module of the mobile communication terminal to the server via the activated data channel for the primary SIM card. In the embodiments of the present disclosure, the first SIM card may be understood as the primary SIM card, and the second SIM card may be understood as the secondary SIM card.

In this regard, it is unnecessary for the mobile communication terminal to switch the data channel from the primary SIM card to the secondary SIM card, so as to prevent the occurrence of data delay during the handover of the data channel or a data channel handover failure, thereby to improve the network reliability.

When a mobile data network for the first SIM card is in an off state, the mobile communication terminal may detect whether there is a data channel established on the basis of the second SIM card, i.e., whether a mobile data network for the second SIM card has been enabled. When the mobile data network for the second SIM card is in an on state, the mobile communication terminal may transmit the service configuration request message directly via the data channel established on the basis of the second SIM card. In this way, it is unnecessary to switch the data channel for the mobile communication terminal, thereby to improve the network data reliability. When the mobile data network for the second SIM card is in the off state, the mobile communication terminal may output prompt information, so as to prompt the user to enable the mobile data network for the second SIM card, thereby to transmit the service configuration request message via the data channel established on the basis of the second SIM card.

In this regard, the mobile communication terminal may select the data channel in accordance with the on/off state of the data channels corresponding to the first SIM card and the second SIM card respectively, rather than to switch the data channel, so it is able to improve the service processing flexibility as well as the network data reliability.

In addition, the service configuration request may include a service configuration request to which the mobile communication terminal needs to respond and a service request to which the mobile communication terminal does not need to respond. When the service configuration request is the service request to which the mobile communication terminal does not need to respond, in Step 102, the mobile communication terminal may transmit the service configuration request message to the server, and the server may process the service upon the receipt of the service configuration request message. When the service configuration request is the service request to which the mobile communication terminal needs to respond, the mobile communication terminal still needs to receive information from the server so as to process the service.

In this step, when the service configuration request is the supplementary service configuration request, an identifier of the second SIM card may be carried in a data packet header field of the supplementary service configuration request message.

During the implementation, the mobile communication terminal may exchange information with an application server named Extensible Markup Language Configuration Access Protocol (XCAP), so as to complete the service configuration. The identifier of the SIM card for which the service configuration needs to be performed may be carried in a data packet, and the configuration may also be performed via the data network that is not bound to a specific SIM card. In the embodiments of the present disclosure, the mobile communication terminal may acquire the identifier of the second SIM card, generate a header field including the identifier of the second SIM card, a Uniform Resource Locator (URL) and a mobile communication identifier, acquire a request data packet for the supplementary service configuration in accordance with the specification, and transmit the request data packet to the XCAP server.

In the embodiments of the present disclosure, the service processing method may be applied to a mobile terminal having a communication function, e.g., a mobile phone, a tablet personal computer, a laptop computer, a Personal Digital Assistant (PDA), a Mobile Internet Device (MID) or a wearable device.

According to service processing method in the embodiments of the present disclosure, when the service configuration request corresponding to the second SIM card has been detected, whether the data network for the first SIM card has been enabled may be determined, and the service configuration request may be a request to be transmitted via the data network. When the data network for the first SIM card has been enabled, the service configuration request message for the second SIM card may be transmitted via the data network for the first SIM card. In this way, when a service is configured by the mobile communication terminal for one SIM card, the service may be configured via the data network that has already existed in the mobile communication terminal, and it is unnecessary to switch the data network in the mobile communication terminal. As a result, through the service processing method in the embodiments of the present disclosure, it is able to prevent the service for the other SIM card from being interrupted and improve the network reliability of the mobile communication device.

Referring to FIG. 2, the present disclosure further provides in some embodiments a service processing method which mainly differs from that mentioned above in that a response message for the service configuration request message is received via the data network for the first SIM card. As shown in FIG. 2, the service processing method may include the following steps.

Step 201: when a service configuration request corresponding to a second SIM card has been detected, determining whether a data network for a first SIM card has been enabled, the service configuration request being a request to be transmitted via the data network.

The implementation of Step 201 may refer to that of Step 101 mentioned thereinabove, and thus will not be particularly defined herein.

In a possible embodiment of the present disclosure, subsequent to determining whether the data network for the first SIM card has been enabled and prior to transmitting a service configuration request message for the second SIM card via the data network for the first SIM card, the service processing method may further include: when the data network for the first SIM card has been enabled, outputting prompt information for prompting whether to transmit the service configuration request message for the second SIM card via the data network for the first SIM card; and upon the receipt of a positive result from a user to the prompt information, transmitting the service configuration request message for the second SIM card via the data network for the first SIM card.

During the implementation, there may probably exist such circumstances for the mobile communication terminal that data flows available for the first SIM card and the second SIM card are different and corresponding fee balances are different, so the data network for transmitting the service configuration request message may be determined based on the user's selection. For example, when a data plan purchased for a SIM card 1 is 5 G and a data plan purchased for a SIM card 2 is 1M, the user may select the SIM card 1 for the transmission of the service configuration request message because the data flow for the SIM card 1 is relatively sufficient.

To be specific, when the service configuration request corresponding to the second SIM card has been detected, the prompt information for prompting whether to transmit the service configuration request via the data network for the first SIM card may be outputted.

For example, "whether to transmit the service configuration request via the SIM card 1" as well as options "yes" and "no" may be displayed on a screen for the user's selection. When "yes" is selected by the user, the mobile communication terminal may detect the positive result triggered by the user's operation, and then transmit the service request via the data network for the first SIM card. When "no" is selected by the user, the mobile communication terminal may switch the data network to the second SIM card, and then transmit the service request via the data network for the second SIM card.

During the implementation, whether the mobile data network for the second SIM card has been enabled may be detected. When the mobile data network for the second SIM card has been enabled, the mobile communication terminal may transmit the service configuration request message via the data network for the second SIM card that has already existed. When the mobile data network for the second SIM card has not been enabled yet, the mobile communication terminal may output the prompt information for prompting whether to enable the mobile data network for the second SIM card. Upon the receipt of a positive result indicating that the mobile data network is to be enabled from the user, the mobile communication terminal may transmit the service configuration request message via the data network for the second SIM card.

In this regard, the mobile communication terminal may determine the data network for the transmission of the service configuration request based on the user's selection in a flexible manner, so it is able to improve the user experience.

It should be appreciated that, this implementation mode may also be applied to the service processing method in FIG. 1 with a same beneficial effect.

Step 202: when the data network for the first SIM card has been enabled, transmitting the service configuration request message for the second SIM card via the data network for the first SIM card.

The implementation of Step 202 may refer to that of Step 102, and thus will not be particularly defined herein.

Step 203: receiving a response message for the service configuration request message via the data network for the first SIM card.

After the mobile communication terminal has transmitted the service request message to the server, if the service processing may not be performed until the service configuration request has been responded by the mobile communication terminal, the mobile communication terminal may receive the response message via the data network for the first SIM card. In this regard, it is able to perform the service processing without any necessity to switch the mobile data network for the mobile communication terminal during the entire procedure of processing the service request, thereby to improve the network reliability of the mobile communication terminal as well as the user experience.

According to the service processing method in the embodiments of the present disclosure, the response message for the service configuration request message may be received via the data network for the first SIM card, without any necessity to switch the data network from the first SIM card to the second SIM card. As a result, it is able to prevent the data transmission on the data network of the mobile communication terminal from being interrupted, thereby to improve the reliability of the communication network for the mobile communication terminal.

Figure 3:
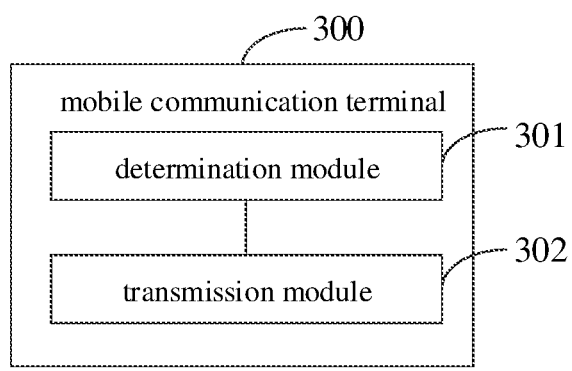
FIG. 3 is a schematic view showing a mobile communication terminal according to one embodiment of the present disclosure.

The present disclosure further provides in some embodiments a mobile communication terminal 300 which, as shown in FIG. 3, includes a determination module 301 and a transmission module 302.

The determination module 301 is configured to, when a service configuration request corresponding to a second SIM card has been detected, determine whether a data network for a first SIM card has been enabled, and the service configuration request may be a request to be transmitted via the data network. The transmission module 302 is configured to, when the determination module 301 determines that the data network for the first SIM card has been enabled, transmit a service configuration request message for the second SIM card via the data network for the first SIM card.

Figure 4:
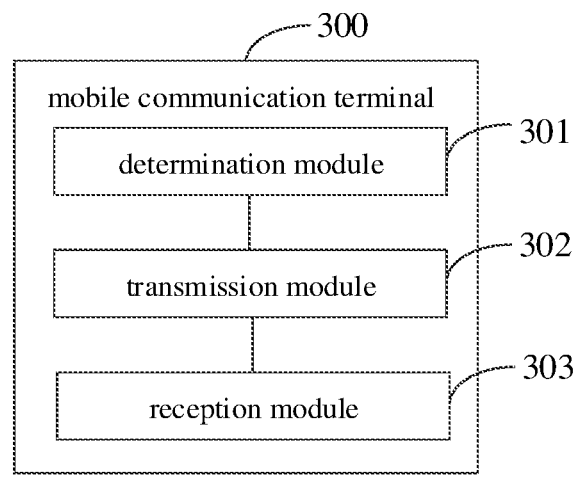
FIG. 4 is another schematic view showing the mobile communication terminal according to one embodiment of the present disclosure.

In a possible embodiment of the present disclosure, as shown in FIG. 4, the mobile communication terminal may further include a reception module 303 configured to receive a response message for the service configuration request message via the data network for the first SIM card.

In a possible embodiment of the present disclosure, the service configuration request may be a supplementary service configuration request, and the supplementary service configuration request may be a request for supplementing or modifying a basic service for the second SIM card.

In a possible embodiment of the present disclosure, an identifier of the second SIM card may be carried in a data packet header field of the supplementary configuration request message.

Figure 5:
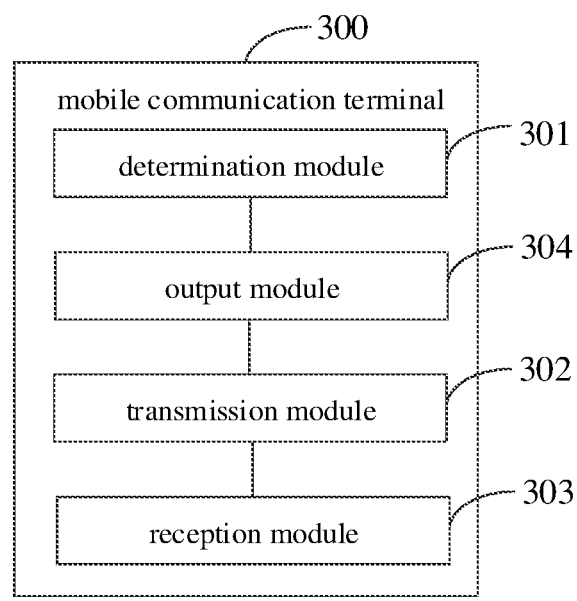
FIG. 5 is yet another schematic view showing the mobile communication terminal according to one embodiment of the present disclosure.

In a possible embodiment of the present disclosure, as shown in FIG. 5, the mobile communication terminal 300 may further include an output module 304 configured to, when the data network for the first SIM card has been enabled, output prompt information for prompting whether to transmit the service configuration request message for the second SIM card via the data network for the first SIM card. The transmission module 302 is further configured to, upon the receipt of a positive result from a user to the prompt information outputted by the output module 304, transmit the service configuration request message for the second SIM card via the data network for the first SIM card.

The mobile communication terminal 300 is capable of implementing the above-mentioned service processing method in FIGS. 1 and 2, which will not be particularly defined herein.

According to the mobile communication terminal 300 in the embodiments of the present disclosure, when a service is configured by the mobile communication terminal for one SIM card, the service may be configured via the data network that has already existed for the mobile communication terminal, and it is unnecessary to switch the data network for the mobile communication terminal. As a result, through the service processing method in the embodiments of the present disclosure, it is able to prevent the service for the other SIM card from being adversely affected.

Figure 6:
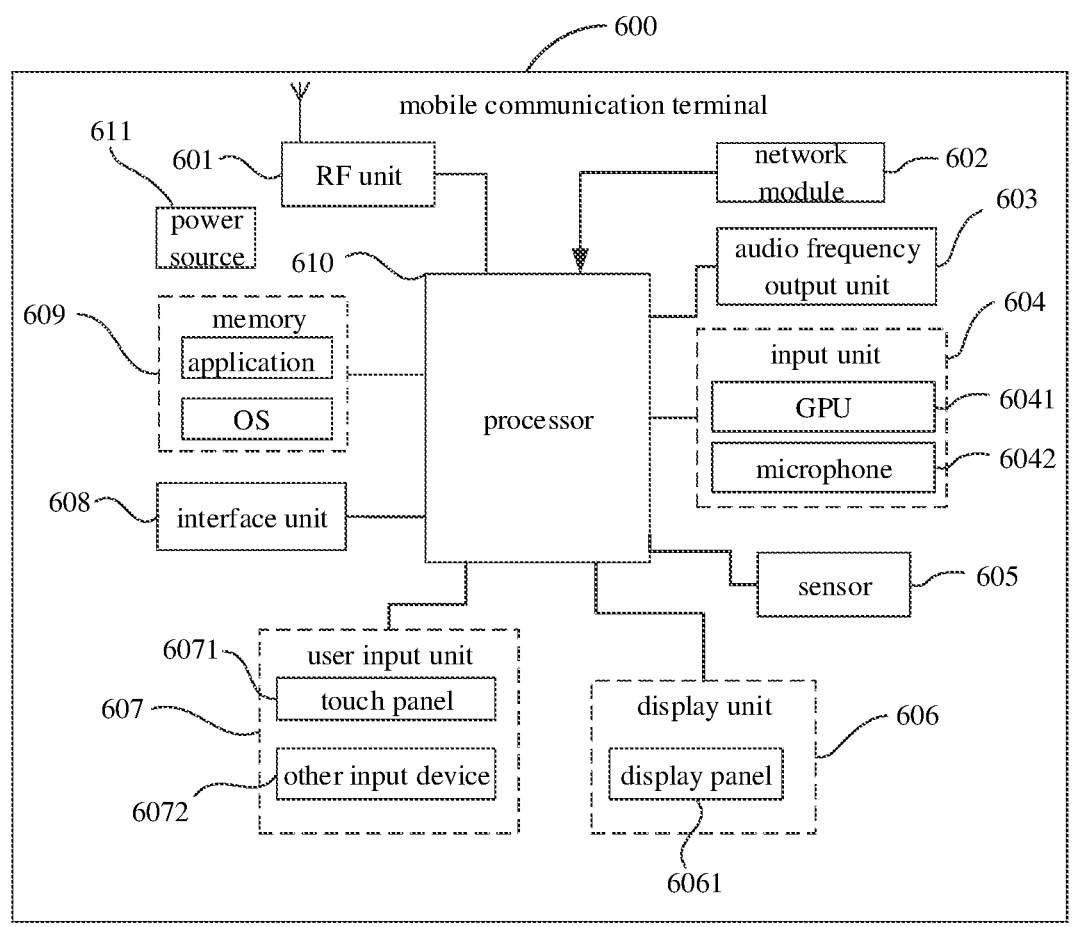
FIG. 6 is still yet another schematic view showing the mobile communication terminal according to one embodiment of the present disclosure.

The present disclosure further provides in some embodiments a mobile communication terminal 600 which, as shown in FIG. 6, includes, but not limited to, a Radio Frequency (RF) unit 601, a network module 602, an audio frequency output unit 603, an input unit 604, a sensor 605, a display unit 606, a user input unit 607, an interface unit 608, a memory 609, a processor 610, and a power source 611. It should be appreciated that, the mobile communication terminal as shown in FIG. 6 may not intend to limit the mobile communication terminal, it may include more or fewer members, or some members may be combined, or the members may be arranged in different modes. In the embodiments of the present disclosure, the mobile communication terminal may include, but not limited to, mobile phone, tablet personal computer, laptop computer, PDA, vehicle-mounted mobile terminal, wearable device or pedometer.

The processor 601 is configured to: when a service configuration request corresponding to a second SIM card has been detected, determine whether a data network for a first SIM card has been enabled, the service configuration request being a request to be transmitted via the data network; and when the data network for the first SIM card has been enabled, transmit a service configuration request message for the second SIM card via the data network for the first SIM card.

In this regard, when a service is configured by the mobile communication terminal for one SIM card, the service may be configured via the data network that has already existed for the mobile communication terminal, and it is unnecessary to switch the data network for the mobile communication terminal. As a result, through the service processing method in the embodiments of the present disclosure, it is able to prevent the service for the other SIM card from being adversely affected.

In a possible embodiment of the present disclosure, the processor 610 is further configured to receive a response message for the service configuration request message via the data network for the first SIM card.

In a possible embodiment of the present disclosure, the service configuration request may be a supplementary service configuration request, and the supplementary service configuration request may be a request for supplementing or modifying a basic service for the second SIM card.

In a possible embodiment of the present disclosure, an identifier of the second SIM card may be carried in a data packet header field of the supplementary configuration request message.

In a possible embodiment of the present disclosure, the processor 610 is further configured to: when the data network for the first SIM card has been enabled, output prompt information for prompting whether to transmit the service configuration request message for the second SIM card via the data network for the first SIM card; and upon the receipt of a positive result from a user to the prompt information, transmit the service configuration request message for the second SIM card via the data network for the first SIM card.

It should be further appreciated that, in the embodiments of the present disclosure, the RF unit 601 is configured to transmit and receive signals during the information transmission or phone call. To be specific, the RF unit 601 may, upon the receipt of downlink data from a base station, transmit the downlink data to the processor 610 for subsequent processing. In addition, the RF unit 601 may transmit uplink data to the base station. Usually, the RF unit 601 may include, but not limited to, an antenna, at least one amplifier, a transceiver, a coupler, a low-noise amplifier and a duplexer. In addition, the RF unit 601 may communicate with a network and the other devices via a wireless communication system.

The network module 602 is configured to enable the user to access the broadband Internet in a wireless manner, e.g., help the user to receive and send an e-mail, browse a web or access a streaming media.

The audio output unit 603 is configured to convert audio data received by the RF unit 601 or the network module 602, or audio data stored in the memory 609, into an audio signal and output the audio signal as a sound. In addition, the audio output unit 603 is further configured to provide an audio output related to a specific function executed by the mobile communication terminal 600 (e.g., a sound occurring when a calling signal or a message has been received). The audio output unit 603 may include a loudspeaker, a buzzer and a receiver.

The input unit 604 is configured to receive an audio or video signal. It may include a Graphics Processing Unit (GPU) 6041 and a microphone 6042. The GPU 6041 is configured to process image data of a static image or video acquired by an image collection unit (e.g., a camera) in a video capturing mode or an image capturing mode, and a processed image frame may be displayed by the display unit 606. The image frame processed by the GPU 6041 may be stored in the memory 609 (or any other storage medium) or transmitted via the RF unit 601 or network module 602. The microphone 6042 is configured to receive a sound, and convert the sound into voice data. In a call mode, the processed audio data may be converted into data in a format capable of being transmitted by the RF unit 601 to a mobile communication base station.

The mobile communication terminal 600 further includes at least one sensor 605. The at least one sensor 605 may include a light sensor, a movement sensor and the other sensors. To be specific, the light sensor may include an ambient light sensor or a proximity sensor. The ambient light sensor is configured to adjust a brightness value of a display panel 6061 in accordance with ambient light. The proximity sensor is configured to turn off the display panel 6061 and/or a backlight source. As one of the movement sensors, an accelerometer may detect acceleration in various directions (usually a three-axis accelerometer), and detect a level and a direction of a gravity force when in a static state. Through the accelerometer, it is able to identify a posture of the electronic device (e.g., perform a switching operation between portrait and landscape orientations, play relevant games, and calibrate a posture of a magnetometer), and perform vibration-related functions (e.g., count steps and strikes). The sensor 605 may further include a fingerprint sensor, a pressure sensor, an iris sensor, a molecule sensor, a gyroscope, a barometer, a hygrometer, a thermometer or an infrared sensor, which will not be particularly defined herein.

The display unit 606 is configured to display information inputted by the user or provided to the user. The display unit 606 may include the display panel 6061, e.g., a Liquid Crystal Display (LCD) panel, or an Organic Light-Emitting Diode (OLED) panel.

The user input unit 607 is configured to receive digital or character information inputted by the user, and generate a key signal input related to user settings and function control of the electronic device. To be specific, the user input unit 607 may include a touch panel 6071 and an input device 6072. The touch panel 6071, also called as touch screen, is configured to collect a touch operation made by the user on or in proximity to the touch panel (e.g., an operation made by the user through any appropriate object or attachment (e.g., finger or stylus) on or in the proximity to the touch panel 6071). The touch panel 6071 may include a touch detection unit and a touch controller. The touch detection unit is configured to detect a touch position and a signal generated due to the touch operation, and transmit the signal to the touch controller. The touch controller is configured to receive touch information from the touch detection unit, convert it into coordinates of a touch point, transmit the coordinates to the processor 610, and receive and execute a command from the processor 610. In addition, the touch panel 6071 may be of a resistive type, a capacitive type, an infrared type or a surface acoustic wave (SAW) type. The other input device 6072 may include, but not limited to, a physical keyboard, a functional button (e.g., a volume control button or an on/off button), a trackball, a mouse, and a joystick, which will not be particularly defined herein.

Further, the touch panel 6071 may cover the display panel 6061. When the touch operation made on or in proximity to the touch panel 6071 has been detected, the touch panel 6071 may transmit the touch information to the processor 610, so as to determine a type of a touch event. Then, the processor 610 may control the display panel 6061 to provide a corresponding visual output in accordance with the type of the touch event. Although the touch panel 6071 and the display panel 6061 are configured as two separate members in FIG. 6, in some embodiments of the present disclosure, they may be integrated so as to achieve the input and output functions of the electronic device, which will not be particularly defined herein.

The interface unit 608 is configured to provide an interface between an external device and the mobile communication terminal 600. For example, the external device may include a wired or wireless headset port, an external power source port (or a charging port), a wired or wireless data port, a memory card port, a port for a device having an identification module, an audio input/output (I/O) port, a video I/O port, and an earphone port. The interface unit 608 is configured to receive an input from the external device (e.g., data information and electricity) and transmit the input to one or more elements of the mobile communication terminal 600, or transmit data between the mobile communication terminal 600 and the external device.

The memory 609 is configured to store therein a software application and various data. It may mainly include an application storage area and a data storage area. An operating system and at least one application for the functions (e.g., an audio/image playing function) may be stored in the application storage area. Data created in accordance with the operation of the mobile phone (e.g., audio data and textbook) may be stored in the data storage area. In addition, the memory 609 may include a high-speed random access memory (RAM), or a non-volatile memory (e.g., at least one magnetic disk or flash memory), or any other volatile solid state memory.

As a control center of the mobile communication terminal, the processor 610 may be connected to the other members of the mobile communication terminal via various interfaces and circuits, and configured to run or execute the software program and/or module stored in the memory 609, and call the data stored in the memory 609, so as to execute the functions of the mobile communication terminal and process the data, thereby to monitor the entire mobile communication terminal. The processor 610 may include one or more processing units. In a possible embodiment of the present disclosure, an application processor and a modem may be integrated into the processor 610. The application processor is mainly configured to process the operating system, a user interface and the application. The modem is mainly configured to process wireless communication. It should be appreciated that, the modem may also not be integrated into the processor 610.

The power source 611 (e.g., a battery) is configured to supply power to the members of the mobile communication terminal 600. In a possible embodiment of the present disclosure, the power source 611 is logically connected to the processor 610 via a power source management system, so as to achieve such functions as charging, discharging and power consumption management through the power source management system.

In addition, the mobile communication terminal 600 may include some functional modules not shown in FIG. 6, which will not be particularly defined herein.

The present disclosure further provides in some embodiments a mobile communication terminal, which includes a processor 610, a memory 609, and a computer program stored in the memory 609 and executed by the processor 610. The processor 610 is configured to execute the computer program so as to implement the above-mentioned service processing method with a same technical effect, which will not be particularly defined herein.

The present disclosure further provides in some embodiments a computer-readable storage medium storing therein a computer program. The computer program is executed by a processor so as to implement the above-mentioned service processing method with a same technical effect, which will not be particularly defined herein. The computer-readable storage medium may be a ROM, a RAM, a magnetic disk or an optical disk.

It should be appreciated that, such words as "include" or "including" or any other variations involved in the present disclosure intend to provide non-exclusive coverage, so that a procedure, method, article or device including a series of elements may also include any other elements not listed herein, or may include any inherent elements of the procedure, method, article or device. If without any further limitations, for the elements defined by such sentence as "including one . . . ", it is not excluded that the procedure, method, article or device including the elements may also include any other identical elements.

Through the above-mentioned description, it may be apparent for a person skilled in the art that the present disclosure may be implemented by software as well as a necessary common hardware platform, or by hardware, and the former may be better in most cases. Based on this, the technical solutions of the present disclosure, partial or full, or parts of the technical solutions of the present disclosure contributing to the related art, may appear in the form of software products, which may be stored in a storage medium (e.g., ROM/RAM, magnetic disk or optical disk) and include several instructions so as to enable a terminal device (mobile phone, computer, server, air conditioner or network device) to execute the method in the embodiments of the present disclosure.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A service processing method applied for a mobile communication terminal which supports a first Subscriber Identity Module (SIM) card and a second SIM card simultaneously, comprising:
    determining, when a service configuration request corresponding to the second SIM card has been detected, whether a data network for the first SIM card has been enabled, wherein the service configuration request is a request to be transmitted via the data network; and
    transmitting, when the data network for the first SIM card has been enabled and a mobile data network for the second SIM card has not been enabled, a service configuration request message for the second SIM card via the data network for the first SIM card;
    wherein subsequent to determining whether the data network for the first SIM card has been enabled and prior to transmitting the service configuration request message for the second SIM card via the data network for the first SIM card, the service processing method further comprises:
    outputting, when the data network for the first SIM card has been enabled, prompt information for prompting whether to transmit the service configuration request message for the second SIM card via the data network for the first SIM card; and
    upon the receipt of a positive result from a user to the prompt information, transmitting the service configuration request message for the second SIM card via the data network for the first SIM card.

2. The service processing method according to claim 1, wherein subsequent to transmitting the service configuration request message for the second SIM card via the data network for the first SIM card, the service processing method further comprises:
    receiving a response message for the service configuration request message via the data network for the first SIM card.

3. The service processing method according to claim 1, wherein the service configuration request is a supplementary service configuration request, and the supplementary service configuration request is a request for supplementing or modifying a basic service for the second SIM card.

4. The service processing method according to claim 3, wherein an identifier of the second SIM card is carried in a data packet header field of the supplementary service configuration request.

5. A mobile communication terminal, comprising a memory, a processor, and a computer program stored in the memory and executed by the processor, wherein the processor is configured to execute the computer program so as to implement the service processing method according to claim 1.

6. A non-transitory computer-readable storage medium storing therein a computer program, wherein the computer program is executed by a processor so as to implement the service processing method according to claim 1.

7. The service processing method according to claim 2, wherein the service configuration request is a supplementary service configuration request, and the supplementary service configuration request is a request for supplementing or modifying a basic service for the second SIM card.

8. A mobile communication terminal which supports a first SIM card and a second SIM card simultaneously, comprising:
   a determination module configured to, when a service configuration request corresponding to the second SIM card has been detected, determine whether a data network for the first SIM card has been enabled, wherein the service configuration request is a request to be transmitted via the data network; and
   a transmission module configured to, when the determination module determines that the data network for the first SIM card has been enabled and a mobile data network for the second SIM card has not been enabled, transmit a service configuration request message for the second SIM card via the data network for the first SIM card;
   an output module configured to, when the data network for the first SIM card has been enabled, output prompt information for prompting whether to transmit the service configuration request message for the second SIM card via the data network for the first SIM card,
   wherein the transmission module is further configured to, upon the receipt of a positive result from a user to the prompt information outputted by the output module, transmit the service configuration request message for the second SIM card via the data network for the first SIM card.

9. The mobile communication terminal according to claim 8, further comprising a reception module configured to receive a response message for the service configuration request message via the data network for the first SIM card.

10. The mobile communication terminal according to claim 8, wherein the service configuration request is a supplementary service configuration request, and the supplementary service configuration request is a request for supplementing or modifying a basic service for the second SIM card.

11. The mobile communication terminal according to claim 10, wherein an identifier of the second SIM card is carried in a data packet header field of the supplementary service configuration request.

12. The mobile communication terminal according to claim 9, wherein the service configuration request is a supplementary service configuration request, and the supplementary service configuration request is a request for supplementing or modifying a basic service for the second SIM card.

* * * * *